(12) United States Patent
Ehrenleitner (10) Patent No.: US 7,971,496 B2
(45) Date of Patent: Jul. 5, 2011

(54) METHOD FOR DETERMINING THE ELASTIC DEFORMATION OF COMPONENTS

(76) Inventor: Franz Ehrenleitner, Altensteig-Walddorg (DE)

( * ) Notice: Subject to any disclaimer, the term of this patent is extended or adjusted under 35 U.S.C. 154(b) by 750 days.

(21) Appl. No.: 11/885,895

(22) PCT Filed: Mar. 1, 2006

(86) PCT No.: PCT/AT2006/000087
§ 371 (c)(1),
(2), (4) Date: Mar. 3, 2008

(87) PCT Pub. No.: WO2006/094320
PCT Pub. Date: Sep. 14, 2006

(65) Prior Publication Data
US 2010/0154566 A1 Jun. 24, 2010

(30) Foreign Application Priority Data
Mar. 9, 2005 (AT) .................................. A 401/2005

(51) Int. Cl.
*G01L 1/04* (2006.01)
(52) U.S. Cl. .............................. 73/862.621; 73/862.636
(58) Field of Classification Search ............ 73/862.621, 73/862.641, 862.636
See application file for complete search history.

(56) References Cited

U.S. PATENT DOCUMENTS
2003/0220756 A1   11/2003   Stengele
2008/0093322 A1 *  4/2008   Ehrenleitner ................. 212/274

FOREIGN PATENT DOCUMENTS
AT   A 1694/2004   3/2007
(Continued)

OTHER PUBLICATIONS
Thomas et al. "Coordinate-free Formulation of a 3-2-1 Wire-based Tracking Device using Cayley-Menger Determinants" Proceedings of the 2003 IEEE Internation Conference on Robotics & Animation. Sep. 14-19, 2003. Available online <http://ieeexplore.ieee.org/stamp/stamp.jsp?tp=&arnumber=1241621>.*

(Continued)

*Primary Examiner* — Lisa M Caputo
*Assistant Examiner* — Jonathan Dunlap
(74) *Attorney, Agent, or Firm* — Lucas & Mercanti, LLP; Klaus P. Stoffel (57) ABSTRACT

The invention relates to a method for determining the elastic deformation of components, especially parallel kinematic devices, under a load. Said method is characterised in that the geometry of the articulation points on the fixed platform (9) and the mobile platform (10) is determined; the replacement spring constants of the actuators (K1, K2, K3) and the replacement spring constants of the bearings are determined; the theoretical length of the actuators is determined; the theoretical position of all of the articulation points in the area is determined therefrom; the forces acting on the individual actuators are determined from said geometry and the load (F); and the real geometrical image and thus the real position of the mobile platform are determined from said forces. The real position is compared with the calculated theoretical position and is brought into line by the actuation of corresponding actuators.

2 Claims, 7 Drawing Sheets

FOREIGN PATENT DOCUMENTS

| | | |
|---|---|---|
| AT | A 1702/2004 | 6/2007 |
| AT | A 1695/2004 | 12/2007 |
| AT | A 1918/2004 | 1/2008 |
| EP | 1 491 287 | 12/2004 |
| JP | 7276273 | 10/1995 |
| WO | 99/28095 | 6/1999 |
| WO | 01/76829 | 10/2001 |

OTHER PUBLICATIONS

Bruyninckx H: "The 321-HEXA: A Fully Parallel Manipulator With . . . ", Robotics and Automation, 1997, BD. 3, April 20, 1997, pp. 2657-2662.

Griffis M et al "Kinestatic Control: A Novel Theory for . . . ", Journal of Mechanical Design USA, BD. 113, No. 4, Dec. 1991, pp. 508-515.

* cited by examiner

METHOD FOR DETERMINING THE ELASTIC DEFORMATION OF COMPONENTS

The invention pertains to a method for determining and possibly compensating for the elastic deformation of fixed or movable structures, especially the parts of parallel-kinematic devices, under load.

A "structure" in the present application is to be understood as the mechanical structure under consideration at the moment. Because of the many ways in which the invention can be applied, objects such as cranes, transport devices on land or in manufacturing facilities, parts of these structures, hoists, booms, tool guides; structures such as bridges; objects used in process technology such as boilers, reactors, etc.; as well as vehicles and the like can all be considered "structures".

The determination of the elastic deformation of structures under static and/or dynamic load is a prerequisite for a large number of different applications. First, the safety of the structures can thus be ensured; second, the positional accuracy of the structure during, for example, the automated assembly of an object can be determined; and, third, it is possible under certain conditions to determine the path along which the object should travel. Many other applications are also possible.

EP 1 491 287 A, for example, deals with these problems. It describes a way in which a sensor can center itself automatically. This centering is a key problem in automated manufacturing processes when, for example, a measuring device or a drive device must be centered on an object. According to the solution, three measuring rods are provided at suitable points on the device, and the values which they indicate at the moment in question are used to calculate the position of the object at that same moment. A solution of this type is useful and feasible for a specific, uniform type of testing, but it cannot deal with continuously changing conditions such as the raising and lowering of different loads at different locations as is always the case with cranes.

Another problem is solved by US 2003/0,220,756 A: To calibrate the movements of a parallel-kinematic device such as a tool carrier in a Cartesian coordinate system, the intended movement of the tool carrier is performed step by step, and the various positions and possibly the speeds of the actuators are determined point for point; possible tolerances and errors are taken into account as well. Through suitable evaluation by means of Jacobi determinants and linearized relationships between the parameters of the actuators and the Cartesian coordinate system, it is possible to give control commands to the actuators by means of which the intended movement is performed.

Of course, this relationship is valid only for the test case and completely ignores, for example, the various forces acting on the tool (sharp or dull tool; hard or soft material, etc.).

Parallel-kinematic devices are those which are based on the realization that a rigid body has six degrees of freedom in space and that it is therefore possible to determine the position in space of a rigid body of this type by means of six independent variable-length distance pieces, usually in the form of rods, although cables or the like can be used in many cases. These distance pieces are usually called actuators, and they are permanently fixed in space at one end (the "fixed" platform) and act in an articulated manner at the other on the body to be moved (the "movable" platform).

These parallel-kinematic devices offer the great advantage that the tolerances which occur in association with the movement of the individual actuators are not additive, because there is no kinematic system which is itself seated on another kinematic system, as is the case with the standard arrangements. As a result, the ratio of useful load to supporting load can be dramatically increased.

The disadvantage and for many years a factor which severely limited the use of such devices is the difficulty of calculating the necessary changes in the length of the actuators and of calculating how these changes in length are to occur over the course of time in order to move the rigid body, usually called the movable platform, in the desired manner.

For many years, therefore, these parallel-kinematic devices have been used successfully only in tire test stands and in flight simulators, whereas the standard solution for the mounting of cutters in machine tools, for designing the structure of cranes, etc., and for designing almost all other types of movable structures was to provide a first slide, which moves along one axis; to seat a second slide, which moves in the direction normal to the first, on this first slide, and so on, until finally the bucket of the bulldozer or the tool of the lathe, etc., is attached to the last of these slides. It can also be seen from these examples that cables can also be used instead of rods in some of these areas of application.

In "Coordinate-Free Formulation of a 3-2-1 Wire-Based Tracking Device using Cayley-Menger Determinants", published on Sep. 14, 2003 on the occasion of the International Conference on Robotics and Automation in Taipei, Taiwan, F. Thomas, E. Ottaviano, L. Ros, and M. Ceccarelli describe a parallel-kinematic device in which three of the actuators act on a common point on a movable platform and two others act on another, common point, hence the designation 3-2-1 kinematics. As a result of this arrangement of the actuators, it becomes possible to simplify the above-mentioned complicated calculations. A great disadvantage of this arrangement, however, is that it is extremely difficult in practice to have three rods (or, as in the article, simply cables) act on one point, for which reason only theoreticians have paid any attention so far to this special case of a parallel-kinematic device.

In the as-yet unpublished Austrian Patent Applications A 1694/2004, A 1695/2004, A 1702/2004, and A 1918/2004 of the present applicant, a possibility is described for replacing these types of multiple joints with so-called "pseudo-triple points" or "pseudo-double points", which greatly simplifies the construction of these joints while still preserving the geometric advantages of 3-2-1 kinematics and especially its mathematical accessibility. The content of these publications and of the PCT application corresponding to them is herewith included by reference in the content of the present application.

It therefore also becomes possible to use parallel kinematics for machine tools and load-hoisting machines, etc. So that the advantages of parallel kinematics can also be fully exploited and especially so that in particular the advantages of accuracy and lightweight construction can be carried even further, it is desirable to detect the elastic deformation of the parallel-kinematic device at any desired moment and to compensate for it by the appropriate actuation of the actuators, as a result of which the accuracy of the movement can be increased and/or the weight of the device can be decreased. Because of the limitations of the prior art explained above, no one ever really dealt with this possibility, because the computations were at best sufficient to take into account the changes in the lengths of the rods, but not the changes in the positions of the bearings, which are of the same order of magnitude or often even larger than those of the rods.

In his intensive work on the practical possibilities of 3-2-1 kinematics, the inventor found that, if an appropriate equivalent kinematic system is used, it becomes possible to calculate the positions and the positional changes of the attack points of the actuators extremely quickly and accurately, as a result of which the elastic deformations caused by the load can also be determined in time. The inventor has been able to establish that, in this context and for this purpose, the equivalent kinematic system also makes it possible to construct models of structures which have nothing to do with parallel-kinematic devices or frames and to determine their deformations, which until now, could be calculated if at all only by the method of finite elements.

It is therefore a special goal of the invention to provide a method of the type indicated above which in particular makes it possible to calculate the instantaneous deformations so quickly that compensation can be implemented with such a short delay that, in the case of a tool carrier, no errors will occur at the workpiece, or, in the case of a load-lifting machine, no damage will occur to the merchandise or to the structure, and the people in the area of the machine will not be exposed to any danger.

A general goal of the invention is to provide an equivalent kinematic system of the 3-2-1 type for any desired structure, even those which do not correspond to any parallel kinematics, such as pipes, welded structures, shells, domes, crane booms, etc. (in general, "structures"), namely, a kinematic system which allows rapid determination of the global elastic deformation under load. The concept "global" stands here for the fact that, on the basis of the equivalent kinematic system, only the deformation or positional change of the movable platform versus the fixed platform can be derived, not the deformation of the areas situated between the two platforms.

According to the invention, the special goals of the 3-2-1 kinematic system are achieved in that:

(a) the geometry of the hinge points on the fixed platform and on the movable platform or possibly on an intermediate platform are determined and stored; and in that the equivalent spring constants of the mountings in the foundation and of the movable or possibly of the intermediate platform (i.e., the hinge points of the actuators), the equivalent spring constants of the actuators, and the equivalent spring constants of the bearings are determined and stored; in that (b) the instantaneous theoretical lengths of the actuators are determined on the basis of the settings of their drives; in that (c) on that basis, the theoretical positions in space of all the hinge points or of all the actuators are determined for these values; in that (d) on the basis of this geometry and the load, which is either known or determined by sensors on the actuators and/or on the movable platform, the forces acting on the individual actuators, joints, and bearings, are determined; in that (e) on the basis of these forces and the equivalent spring characteristics, the real, instantaneous position of the bearings and the lengths and positions of the actuators are determined, from which the real instantaneous geometric model and thus the instantaneous real position of the movable platform are determined; and in that (f) this real position is compared with the previously calculated theoretical position and is brought into agreement with the theoretical position if necessary by actuation of the appropriate actuators.

For parallel-kinematic devices according to the prior art, the calculations could not be carried out quickly enough to be usable in practice in spite of the available computing power. Only through the use of the so-called 3-2-1 kinematic system and especially through its realization in the form of so-called pseudo-double joints and pseudo-triple joints, has it become possible for the first time to take the deformations into account.

The solution of the general problem comprises not only the steps given above but also the creation of the equivalent kinematic system, which will not be difficult for the expert once he is familiar with the invention. The loads to be expected for the concrete application in question can be taken into consideration with respect to the choice of the equivalent frame to the extent that symmetries can contribute to further simplification.

To arrive at the required equivalent spring constants, the individual components can be determined on the actual structure by appropriate application of real loads and measurement of the real deformations. These components are then assigned on the equivalent frame to the individual rods, bearings, and attack points, in order to arrive at a corresponding model in the area of the "movable platform". Instead of the measurement of real deformations, however, it is also possible to make a thorough calculation of the deformations of the structure by means of the method of finite elements, for example. It must be remembered, however, that this calculation has to be carried out only once and that it is independent of the later use of the obtained results when the structure is subjected to load. The large amount of computational work is therefore not associated with any disadvantageous effects. It must also be kept in mind that the calculations involved are calculations of deformations which (at least taken individually) are orders of magnitude smaller than the size of the structure or the distance which it travels.

The concept of a movable platform in its general meaning is defined quite simply as the geometric area of the structure for which the change in position is to be calculated. In the case of the real structure, the movable platform is preferably also a solid part, to be considered rigid under certain conditions, such as: the end of the boom of a crane, the cutting edge of the tool (TCP: Tool Center Point), the suspension point of an insulator from a pylon, the tip of the measuring probe of a measuring instrument, the holder for the wire of a spark erosion device, etc. In comparison, a "fixed platform" is in general a base which is to be considered "fixed" within the scope of the specific task at hand, independently of the actual situation in relation to the ground, and is thus a question of appropriate definition.

The inventive 3-2-1 kinematic system and the equivalent spring constants are derived from the results of the investigation of the real structure, with or without the deformations of the (or some of the) bearings, depending on the area of application. The real forces are then applied mathematically to the 3-2-1 equivalent kinematic system. The calculated deformations (positional changes between the fixed and the movable platform) yield, in a direct or easily calculatable way, the change in position on the real structure and thus make it possible to make the necessary corrections and/or to arrive at the desired knowledge.

The invention is explained in greater detail below on the basis of the drawing.

Figure 1:
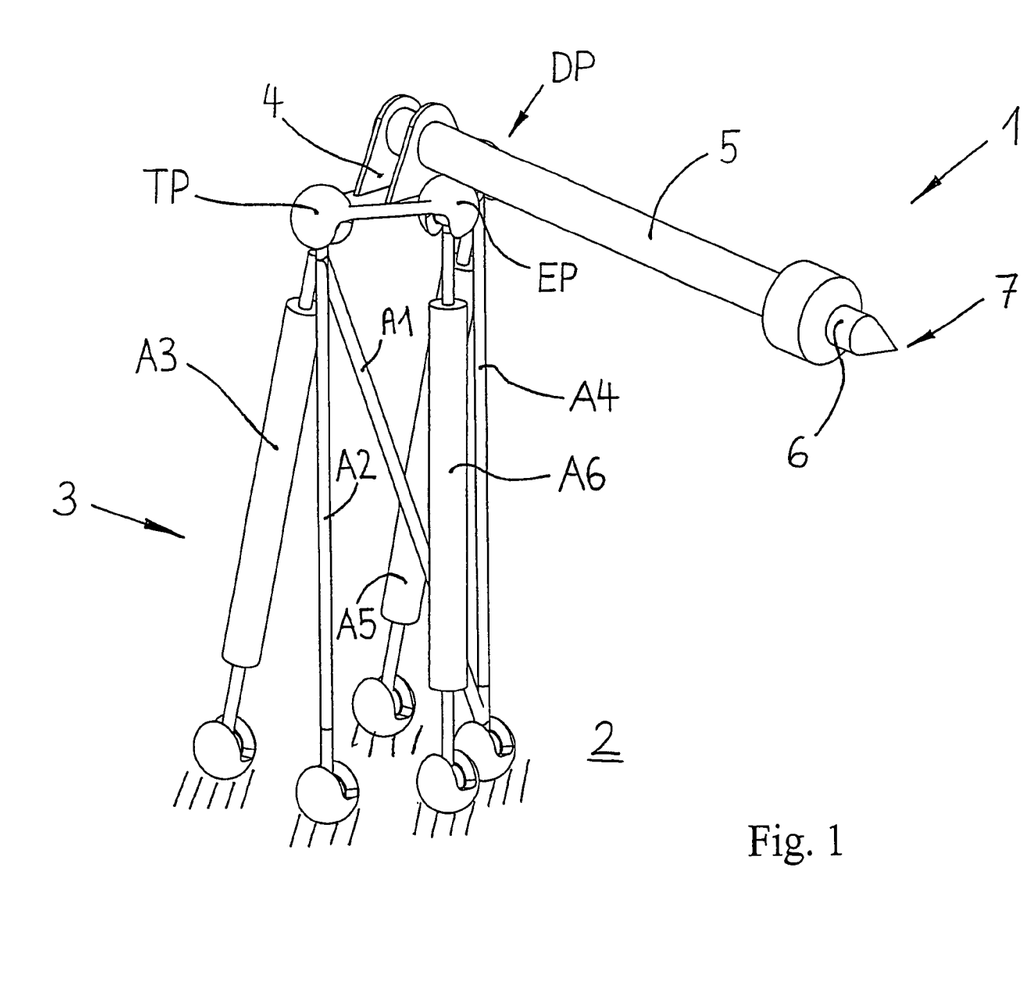
FIG. 1 shows a real parallel kinematic system with a movable platform consisting of a tube.

FIG. 1 shows a purely schematic diagram, in perspective, of a parallel-kinematic device 1. It consists of a fixed platform 2, which can be, for example, the foundation or possibly a slide or a carriage, on which the actual parallel-kinematic system 3, i.e., the rods and actuators which form it, are pivotably supported. The other ends of the rods and actuators, in the following referred to in brief simply as the "actuator", support a movable platform 4. This movable platform 4, in the exemplary embodiment illustrated here, has a tube 5 permanently connected to it, on the free end of which a tool holder 6 is suggested schematically, the tip of which represents the Tool Center Point (TCP) 7.

Because the adjustable actuators of the device 1 can bring the TCP 7 to any desired location within their range but cannot influence its orientation, additional adjusting mechanisms (not shown) are also usually included in the tool holder 6. These mechanisms make it possible, at least within certain limits, to bring the orientation of the TCP 7 into alignment with the desired orientation.

The actual parallel kinematic system 3 is designed in accordance with the previously explained 3-2-1 principle; that is, three actuators A1, A2, and A3 have a common attack point, namely, the triple point (TP) on the movable platform 4, and two other actuators, namely, actuators A4 and A5, act on the double point (DP), which is hidden by the tube 5 in FIG. 1, whereas the actuator A6 acts by itself on the single point (EP).

In the exemplary embodiment illustrated here, the actuators A3, A5, and A6 are shown as variable-length actuators; actuators A1, A2, and A4 are shown as rods of constant length. This is only for the sake of illustration, and the actuators do not have to be assigned this way. Actuators other than those indicated can have variable lengths, and more than three can be of this type. This can also have an effect on the design of the tool holder 6. As previously mentioned, only variable-length rods are usually referred to as actuators, but, for the sake of readability, this is not done here in the specification and in the claims, because it does not play a role in the invention itself; instead, all of the rods, regardless of whether they are of fixed length or actuators in the strict sense are generally referred to here as actuators.

The position of the movable platform 4 in space is uniquely determined with respect to the fixed platform 2 by the length of the actuators A1-A6 and by the position of the base points of these six rods on the fixed platform 2 and on the movable platform 4, and thus the position of TCP 7 is also uniquely determined, because the tube 5 means that it must be considered a component of the movable platform 4.

As can be easily seen from the form and dimensions of the movable platform 4, it is deformed by the forces acting on TCP 7, so that the movable platform 4, as well as the parallel kinematic system 3, is not to be considered rigid but rather as an elastically deformable structure.

In many areas of application, it is necessary to know or to maintain with high precision the instantaneous position of the TCP 7 and the path along which it moves over time. Even if the actuators and the movable platform 4 are extremely massive and rigid, problems still exist with mobility in the bearings, and, in the case of variable-length actuators, with the stiffness of their drives.

In addition, the deformation of a structure such as the movable platform 4 with the tube 5 attached to it, plus the tool holder and the tool 6 up as far as the TCP 7, is very difficult to determine, and it takes a long time to determine it even with modern computers.

Figure 2:
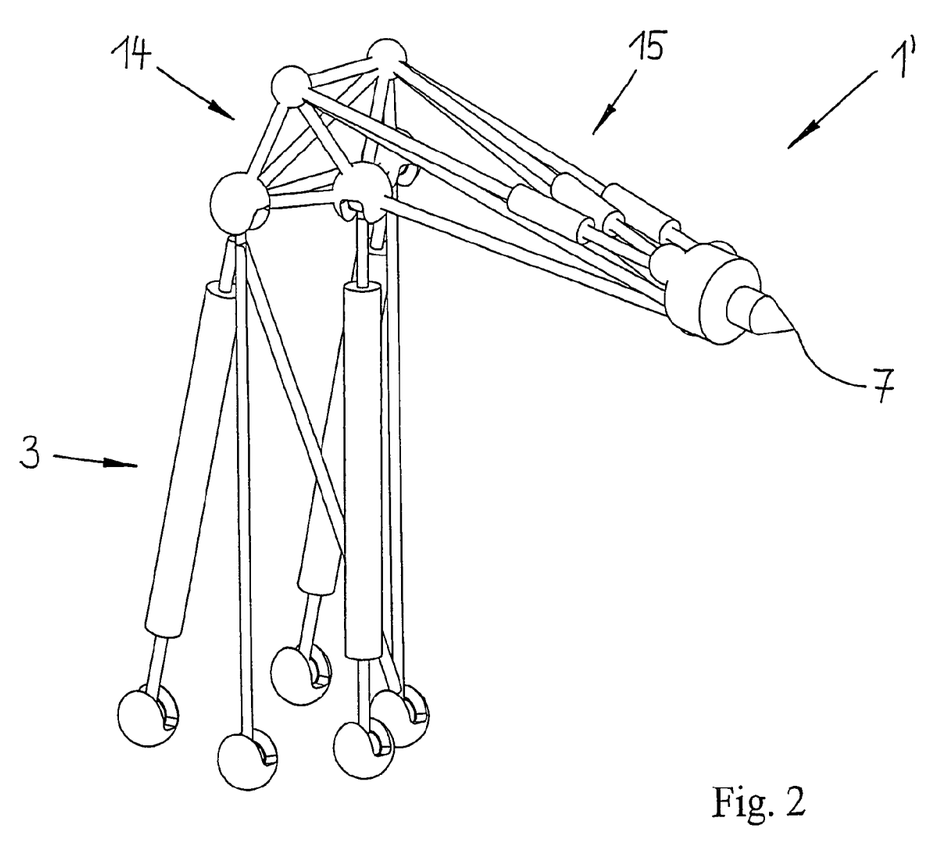
FIG. 2 shows the 3-2-1 equivalent kinematic system with a resolved platform.

These difficulties can be avoided according to the invention by replacing the fixed platform 4 by the two-fold model of a 3-2-1 parallel kinematic configuration shown in FIG. 2, namely, a fixed frame 14 for the actual movable platform 4 and an adjustable 3-2-1 frame 15 for the tube 5 together with the tool holder 6 and the tool up to and including the TCP 7. The variable-length actuators E1, E2, and E3 in the adjustable frame 15 serve as a substitute for the adjusting mechanisms in the tool holder 6. The frames 3, 14, 15 according to FIG. 2 are now, according to the invention, supplemented or replaced by the equivalent spring forces indicated in FIG. 3, where, in the example illustrated here, the deformations occurring in the bearings on the fixed platform 2 are also taken into account by means of their equivalent spring forces, shown schematically.

Figure 3:
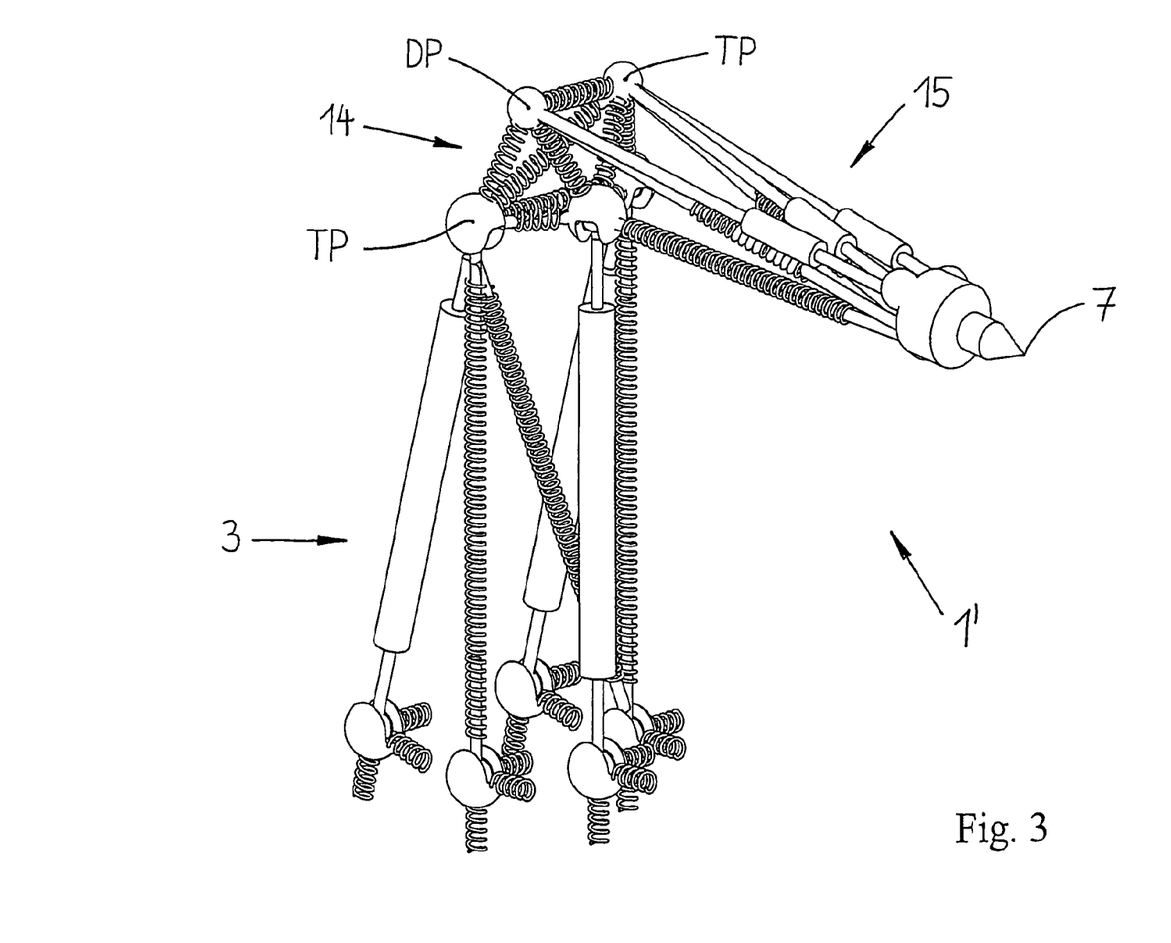
FIG. 3 shows the 3-2-1 equivalent kinematic system with equivalent springs included schematically.

The equivalent spring forces can, for example, be determined for the base points of the parallel kinematic system 3 on the fixed platform 2 by simple experiment; the equivalent spring forces for the movable platform 4 plus the tube 5, resolved into the frames 14 and 15, can be determined either by a calculation according to the method of finite elements or by experiment; that is, the stiffness in the individual directions is determined by practical empirical measurement. These components are then assigned to the individual equivalent rods of the frame.

These comprehensive measurements or calculations are carried out before the assembly and start-up of the device and are thus not subject to any time constraints. It is also possible to carry out the necessary calculations on a computer system different from that which will be available later for the operation of the device.

On the basis of the geometry known from the model, as shown in FIG. 3, it is always possible, if the position of the variable-length actuators is known, to determine the theoretical position of the TCP 7 very quickly. If the force acting on it can be determined, which is easily done in the case of a tool holder by the use of strain gauges or piezoelectric sensors, then, in the knowledge of the equivalent kinematic system according to FIG. 3 and the force acting on it, it is also possible to determine quickly the displacements of the bearing points and the changes in length of the actuators and thus to calculate the real position and orientation of the TCP 7. A comparison of this result with the previously mentioned and previously determined result under no-load conditions makes it possible, through corresponding adjustment of the lengths of the variable-length actuators, to bring the real position into agreement with the theoretical position.

FIGS. 4-7 show an essentially conical body 8, the base 9 of which is assumed to be fixed in space, and on the tip 10 of which a force F is acting. Under the action of this force F and as a result of the fixation of the base 9, the conical body 8 undergoes deformation, the extent and direction of which depend on the geometry of the body and on the material of which it is made. The displacement of the tip 10 resulting from this deformation can now be either measured or, by use of the method of finite elements, calculated.

Figure 4:
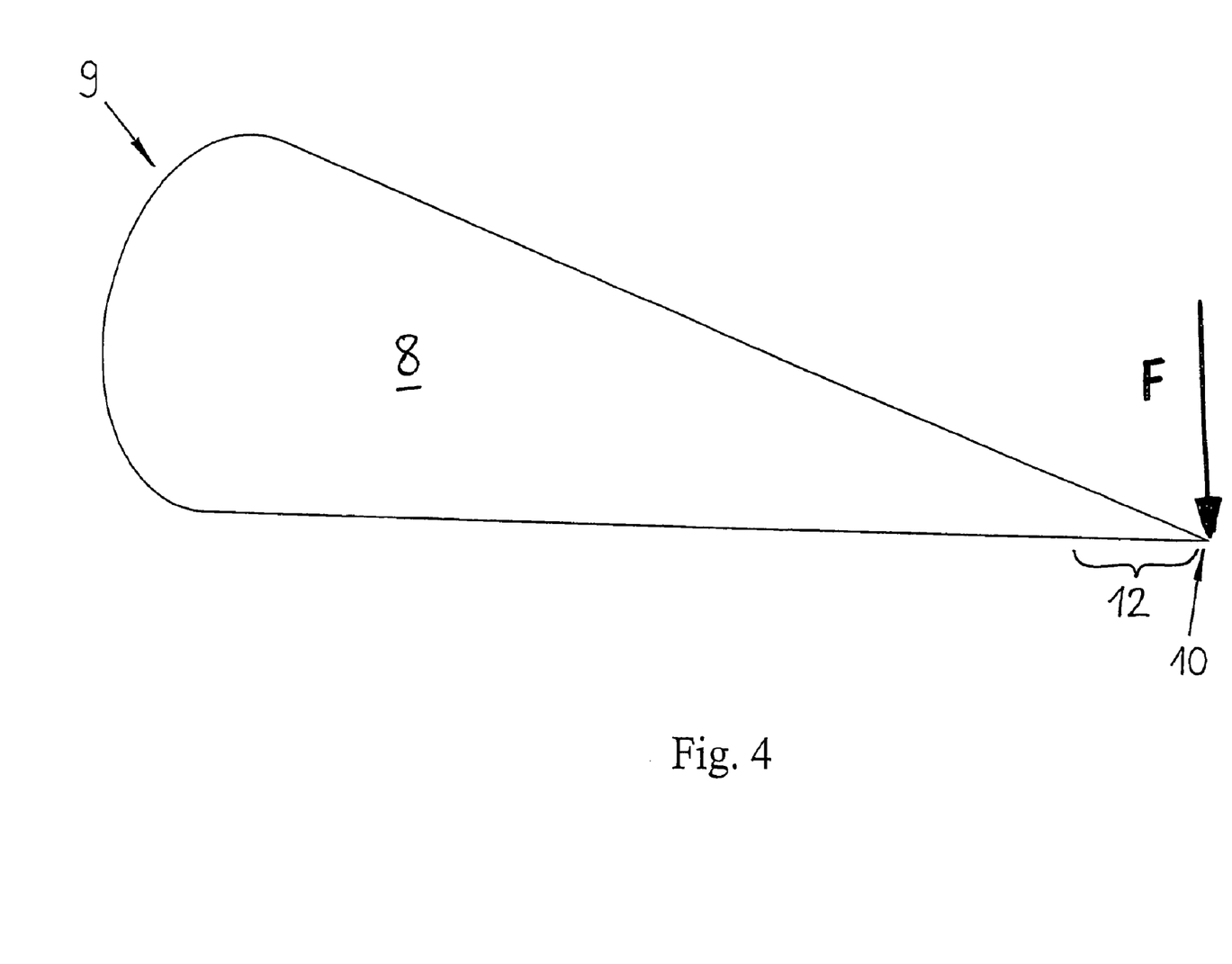
FIGS. 4-7 show an embodiment of an equivalent kinematic system in detail.

If the test forces are orthogonal to each other, three experiments or calculations are sufficient for this determination of the displacement of the tip 10 as a function of the various directions of the force, and under certain conditions, if the tip is not considered a point but rather a small, rigid terminal area 12, the effect of torques on the orientation of this rigid terminal area can also be determined by three measurements or calculation, provided that a suitable arrangement and selection is made, but this possibility is not considered here in the present description of the model.

Figure 5:
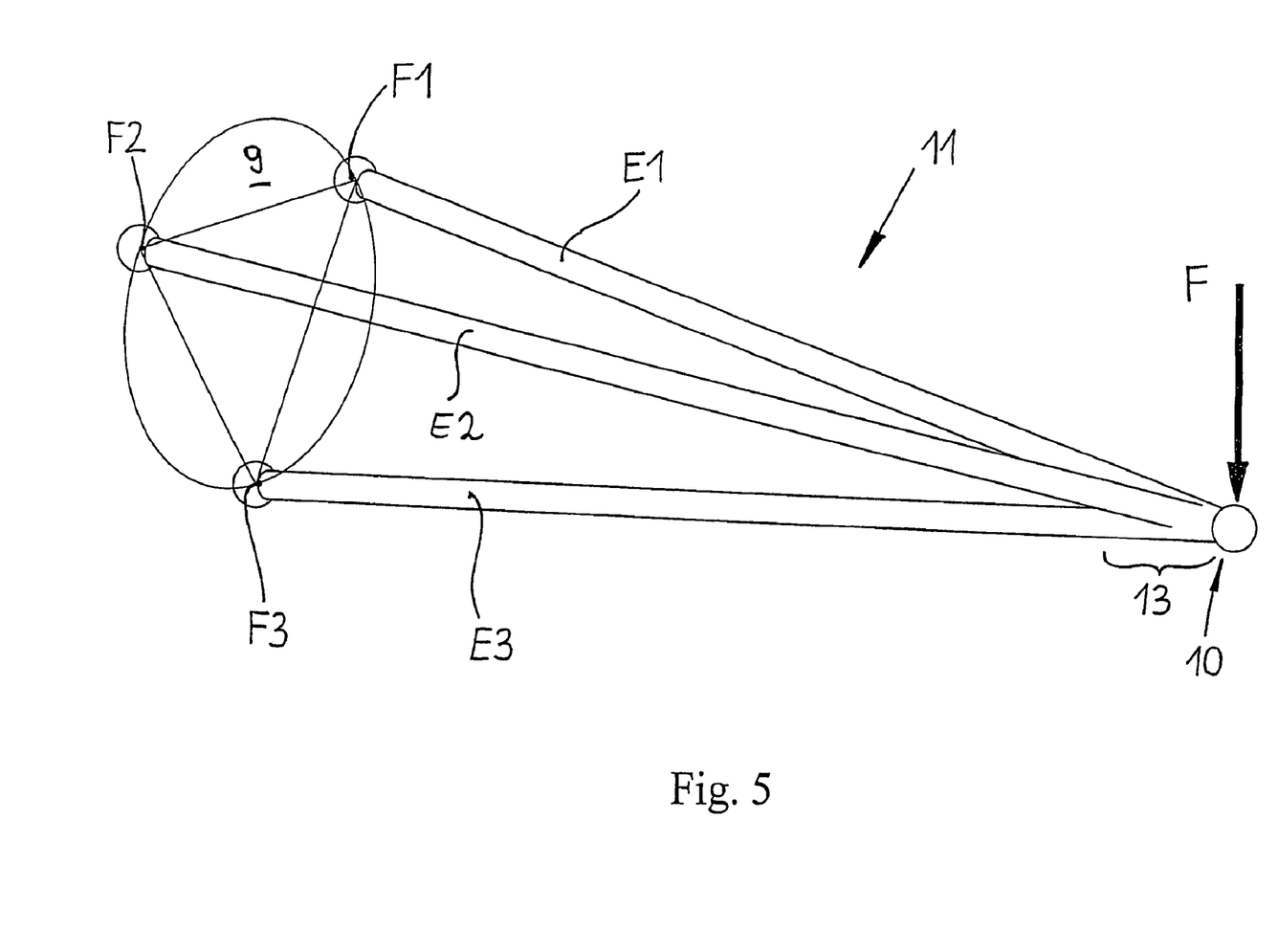

By reason of this limitation to the position of the tip 10 and the action of forces such as the force F, it is possible to use the equivalent frame 11, shown in FIG. 5, consisting of three equivalent rods E1, E2, E2, as a model of the conical body 8. The essential point here is that the ideal end points of the equivalent rods E1, E2, E3 are permanently attached to the base 9 but with freedom to pivot, free of torque, and that they come together to a point at the tip 10 but are articulated with each other there.

The choice of the design of this equivalent frame 11 will be made on the basis of considerations which are familiar to the expert skilled in the science of the strength of materials. When, for example, the body 8 to be replaced has a plane of symmetry or an axis of symmetry, it is advantageous for the equivalent frame also to have these symmetries. When the forces to be expected are significantly greater in one direction than in other directions, then it is favorable for these forces to be absorbed essentially by one equivalent rod or for the equivalent rods to be arranged in such a way that they are symmetric to the surface in which this maximum force or most frequent force causes deformation. It should be kept firmly in mind, however, that even if no attention is paid to these considerations and the frame is set up on the basis of different criteria, the frame is still usable, although, because advantage cannot be taken of the various simplifications which result from the considerations cited above, the computational work will usually be somewhat greater.

Figure 6:
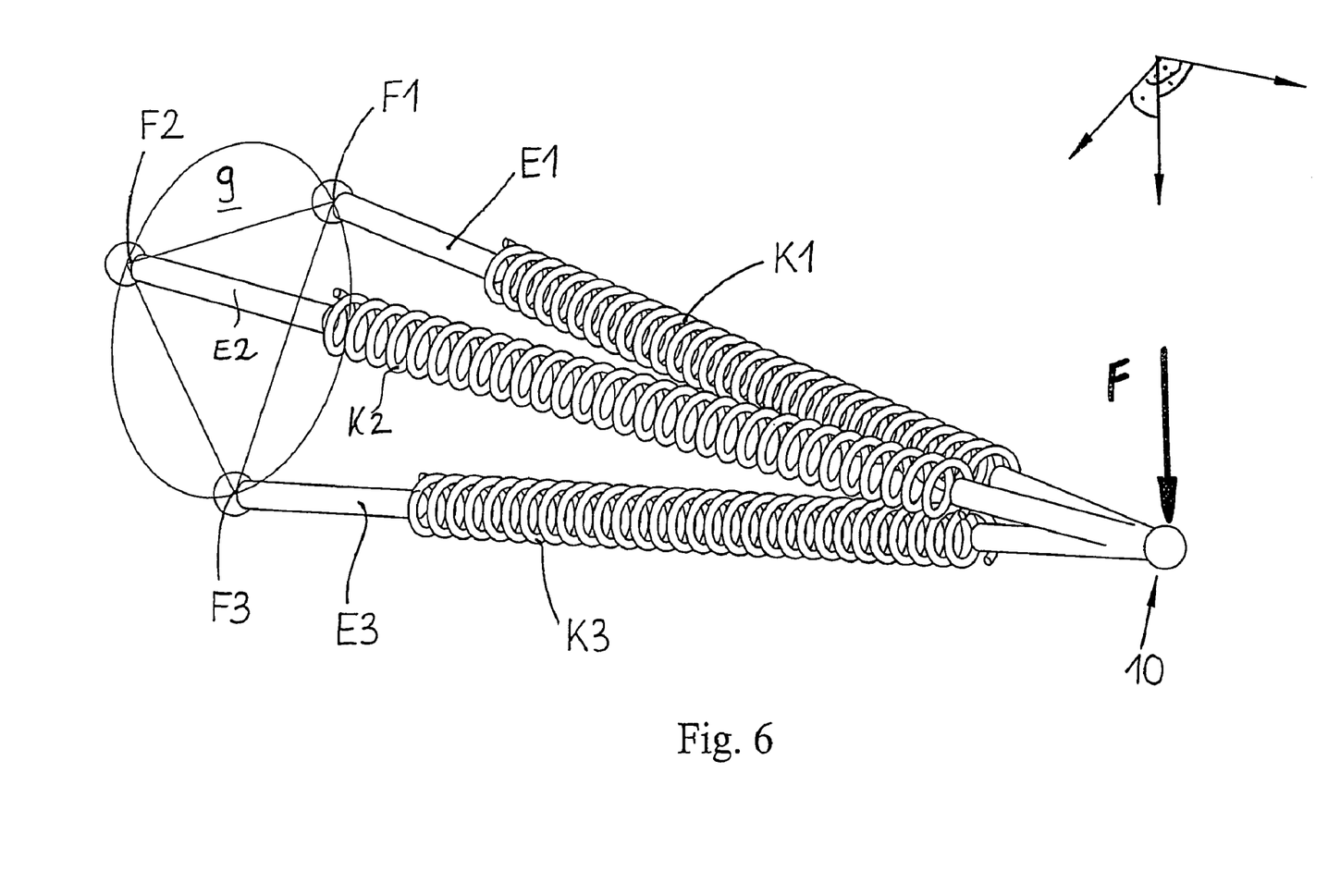

FIG. 6 now shows, in purely schematic fashion, how, under consideration of the equivalent spring constants K1, K2, and K3, the equivalent rods E1, E2, and E3 result in an equivalent structure, which has one thing in common with the original body 8: When the base 9 is fixed, that is, when the base points F1, F2, and F3 of the equivalent rods E1, E2, and E3 are fixed, the tip 10 moves under the force F in exactly the same way as the tip 10 of the real body 8 (for which reason it is designated by the same reference number). This goal can be reached by using the known force F and the known displacement to calculate the equivalent spring constants K1, K2, and K3 which result in sum in exactly this displacement under consideration of the geometry of the selected equivalent frame 11.

Because, under consideration of the deformations in the other directions, suggested only schematically in FIG. 6 as an orthogonal coordinate system, the equivalent frame 11 also leads in the same way to the assigned equivalent spring constants, which always describe only the elongation or compression in the direction of the rod under consideration, it is generally true that, for each of the rods, different equivalent spring constants will be obtained for the different directions.

In various cases, when, for example, the deformation is significant in one direction and nonexistent or very small in the other directions, one can simplify by selecting the equivalent spring constants which supply a correct model of the deformation only in the most important direction. If the various equivalent spring constants do not differ significantly from each other, and if it is necessary to take into account the deformation in several directions, it is also possible to select mean values. Other possibilities, however, are also available:

The first possibility consists in changing the geometry. Here in particular, the base points F1, F2, and F3 of the equivalent rods E1, E2, and E3 can be arranged differently on the base 9, and then the equivalent spring constants K1, K2, and K3 in the three directions are reassigned. On the basis of the result obtained by decreasing the differences between the three equivalent spring constants for one rod in each case or by increasing these differences, it can be seen very quickly in what direction and to what extent the changes must be made in order to arrive at a satisfactory result. Such iterative approximations to the best-possible technical result are standard procedure especially in the area of the strength of materials, especially in the field of mechanical engineering, but also in the fields of building construction and civil engineering, and will therefore present no difficulty to the expert familiar with the invention.

Figure 7:
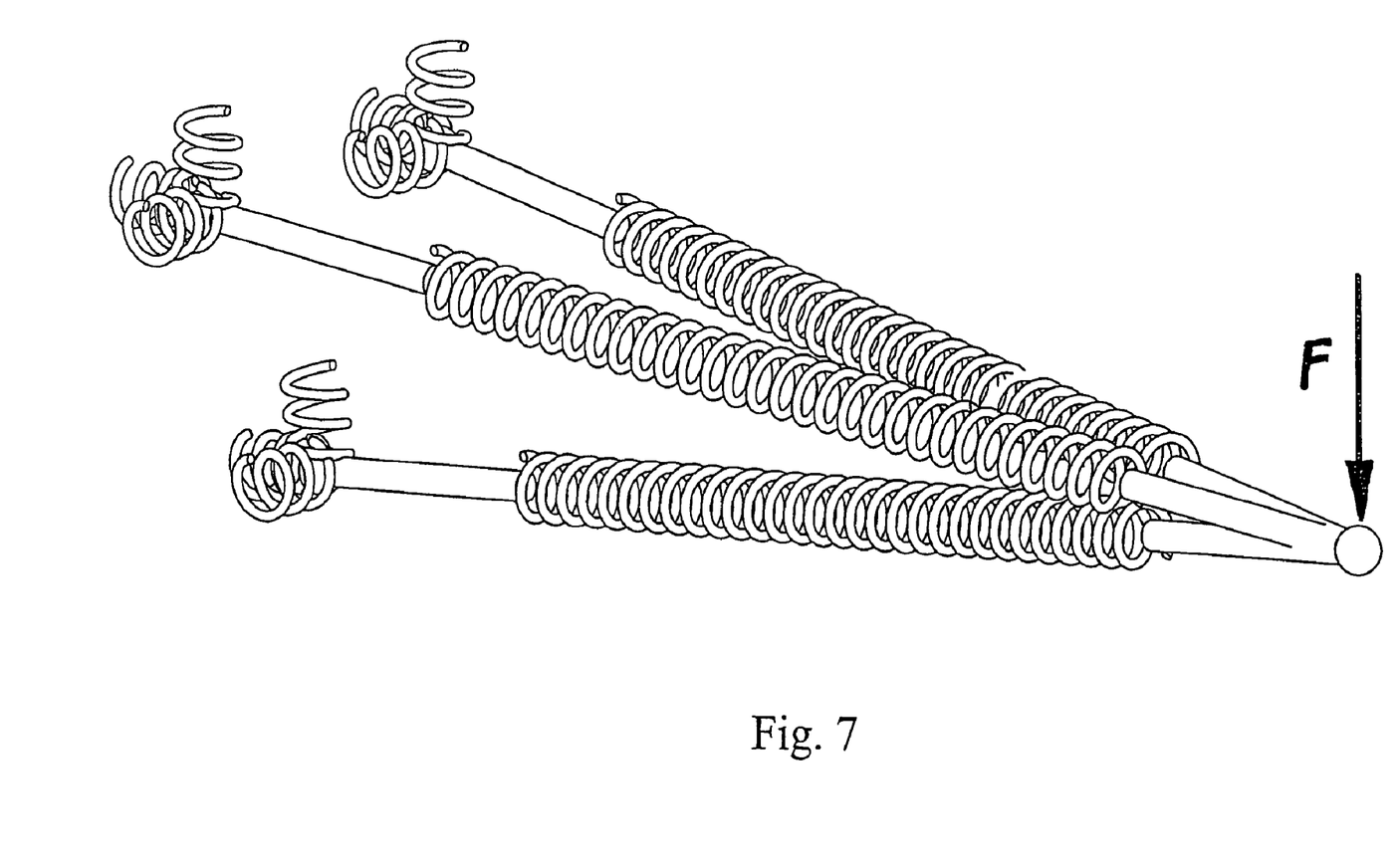

Another possibility, as FIG. 7 shows, is to assign a bearing stiffness to each base point F1, F2, and F3, which means that the base points F1, F2, and F3 in the model are no longer stationary but rather, as a function of the resultant force and the resultant torque (if torque is being considered), move on the base surface and normal to it. Because the suspension of the equivalent rods E1, E2, and E3 from the base points F1, F2, and F3 is without spherical torque, the resulting displacement of the base points is always in the direction of the rod acting on that point at the moment in question, and leads— here, too, an iterative process is possible—through the displacement of the base point to a change in the state of the equivalent frame 11 and thus, under certain conditions, also to a change in the direction of the rod being considered. In most cases, however, these changes are so small that there is no need for any iteration.

The inventive method for modeling a real body 8 in the form of an equivalent frame 11 was described on the basis of a very simple application. The exemplary embodiment which was explained on the basis of FIGS. 1-3 also takes into account, as explained briefly above, the position of a pointed area 12, to be considered a movable platform. Although this area can be easily defined on the real body 8, it would be a mistake to interpret the area 13 on the equivalent frame 11, shown in the drawing only for the purpose of illustration, as a model or as an equivalent pointed area 13, because the model shown in FIG. 5 is able only to model the position of the tip 10 (idealized), not the orientation of a movable platform which might be carrying this tip 10 or of, precisely, a pointed area 12. When this is to be done, an equivalent frame such as the equivalent frame 15 shown by way of example in FIG. 2 must be used.

As can be easily derived from the previously described situation and the method explained here, the dimensions of the kinematic device 1 do not play any role; the inventive method can be applied equally well to a harbor crane as to a machine tool working on the scale of micrometers. The invention can be used not only to control the movement or orientation of the TCP 7 with great accuracy, but the method can also obviously be used to reduce further the weight of the parallel-kinematic device, to increase the velocity at which the TCP 7 can be moved, and to correct the deviations of the TCP 7 from its path, which will now be larger because of the resulting less rigid construction and greater mass moments of inertia. Of course, strategies intermediate between these two forms can also be selected. The expert in the area of application in question will find this easy to do, once he is familiar with the invention.

The invention claimed is:

1. A method for determining and possibly compensating for the elastic deformation between a fixed and a movable platform of a parallel-kinematic device under load, comprising the steps of:
   determining and storing the geometry of the hinge points on the fixed platform and on the movable platform or possibly on an intermediate platform;
   determining and storing the equivalent spring constants of the mountings in the foundation and of the movable or possibly of the intermediate platform;
   determining and storing the equivalent spring constants of the actuators;
   determining and storing the equivalent spring constants of the bearings;
   determining the instantaneous theoretical lengths of the actuators based on the settings of their drives;
   determining the theoretical positions in space of all the hinge points or of all the actuators based on the theoretical lengths;

determining the forces acting on the individual actuators, joints, and bearings based on the determined geometry and known or determined load;

determining the real, instantaneous position of the bearings and the lengths and positions of the actuators to determine the real, instantaneous geometric model and thus the real, instantaneous position of the movable platform; and comparing the real, instantaneous position of the movable platform with the previously calculated theoretical position and actuating the appropriate actuator to bring the real, instantaneous position into agreement with the theoretical position, if necessary.

2. A method for determining the elastic deformation between a fixed surface and a point a certain distance away from the fixed surface or a surface of a structure under load a certain distance away from the fixed surface, comprising the steps of:

creating a 3-2-1 equivalent kinematic system as an equivalent frame so that the fixed platform of the equivalent frame geometrically models the fixed surface and the movable platform of the equivalent frame models the point or surface under consideration;

determining the individual deformation components by way of real load, real force, and possibly real torque and by measuring the resulting real deformation on the real structure in the individual directions;

assigning the individual deformation components on the equivalent frame to the individual rods, bearings, and attack points with their equivalent spring constants so that the movable platform executes the same movement as the point or surface of the real structure;

selectively and alternatively calculating the determination of the deformation of the structure; and subjecting the equivalent frame to the method of claim 1.

* * * * *